F. E. FENDER.
LAMP BURNER.
APPLICATION FILED APR. 23, 1909.
941,315.
Patented Nov. 23, 1909.
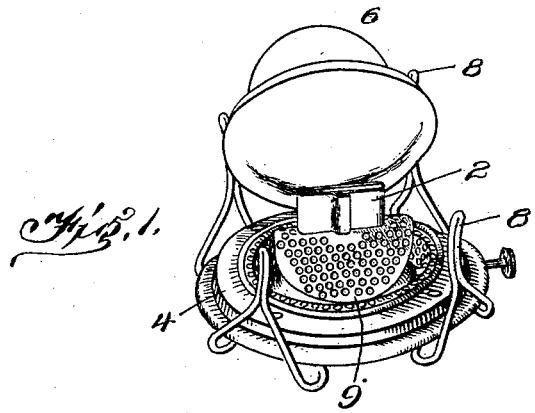
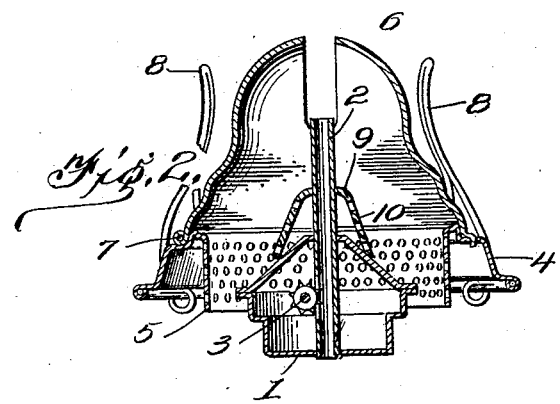
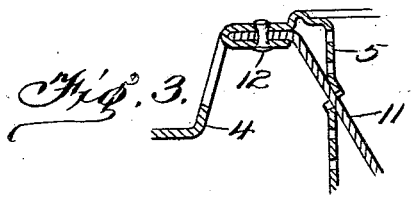
Inventor
Frank E. Fender.
Witnesses
F. C. Gibson.
J. W. Garner.
By Victor J. Evans
Attorney

UNITED STATES PATENT OFFICE.

FRANK E. FENDER, OF LINCOLN, NEBRASKA.

LAMP-BURNER.

941,315.

Specification of Letters Patent.

Patented Nov. 23, 1909.

Application filed April 23, 1909. Serial No. 491,748.

*To all whom it may concern:*

Be it known that I, FRANK E. FENDER, a citizen of the United States, residing at Lincoln, in the county of Lancaster and State of Nebraska, have invented new and useful Improvements in Lamp-Burners, of which the following is a specification.

This invention is an improved lamp burner, the object of the invention being to effect improvements in the construction of the burner whereby objects or particles are prevented from lodging in the burner and the same is enabled to supply a maximum quantity of air to the flame to promote combustion and hence increase the efficiency of the burner for lighting purposes and also prevent the emission of bad odors, and the said invention consists in the construction, combination and arrangement of devices hereinafter described and claimed.

In the accompanying drawings:—Figure 1 is a perspective view of a lamp burner constructed in accordance with my invention, the dome being shown partly raised so as to disclose the air supply plate and the gallery. Fig. 2 is a vertical sectional view of the same. Fig. 3 is a detail vertical sectional view.

The base 1 of the burner may be of the usual form as here shown or of any other suitable form and is provided with the usual wick tube 2 and wick raiser 3. The gallery 4 has its center portion open and is provided with a depending tubular perforated curtain 5, the diameter of which exceeds that of the base so that the latter, the upper portion of which is disposed within the said curtain, is spaced therefrom. The dome 6 which is of usual construction and shape is as usual hinged at one side as at 7 on the gallery. The usual lamp chimney holding springs are indicated at 8.

In accordance with my invention and in addition to the provision of the centrally opened gallery having the dependent perforated tubular curtain, I provide a perforated air supply plate 9 which is of inverted U-shape in cross section and through the center of which the wick tube extends so that the said perforated air supply plate is provided with downwardly and outwardly inclined deflecting portions 10 which bear above the base. The lower portion of the air supply plate is also disposed in the central opening of the gallery and the tubular perforated curtain thereof, but its diameter is somewhat less than that of the curtain so that a space is formed entirely around the said perforated air supply plate and between the same and the perforated curtain and hence a portion of a match or any other object which may fall into the burner will not lodge therein but will pass between the air supply plate and the perforated curtain and will be discharged from the bottom of the latter, the said perforated curtain being, as indicated in the drawing entirely open, from its upper to its lower end.

The air supply plate in connection with the centrally opened gallery having a perforated tubular curtain serves to supply air to the flame in such quantity as to very greatly promote combustion and hence increase the lighting efficiency of the burner. Moreover, when the wick is turned down so as to diminish the light, the increased circulation thus obtained prevents the burner from giving out a disagreeable odor. The usual arms 11 radiate from the base and have their outer ends connected to the gallery as at 12 in Fig. 3 to support the gallery and position the same with reference to the base.

What is claimed is:—

A lamp burner comprising a base having a wick tube, a perforated air supply plate around the wick tube and having downward and outwardly inclined deflecting portions, a gallery having its central portion open and provided with a tubular downwardly extending perforated curtain in which the upper portion of the base and the lower portion of the air supply plate are disposed, said curtain being open at its upper and lower ends and being spaced from the base and the air supply plate, and a dome on the said gallery.

In testimony whereof I affix my signature in presence of two witnesses.

FRANK E. FENDER.

Witnesses:
B. J. MCKAY,
E. MOORE.